United States Patent
Odlum (12)

(10) Patent No.: US 6,197,712 B1
(45) Date of Patent: Mar. 6, 2001

(54) METHOD FOR PRODUCING PHOSPHORESCENT GLASS ARTIFACTS

(75) Inventor: Chris Odlum, 1865 Highway Ave. #19, Salem, OR (US) 97303

(73) Assignee: Chris Odlum, Salem, OR (US)

( * ) Notice: Subject to any disclaimer, the term of this patent is extended or adjusted under 35 U.S.C. 154(b) by 0 days.

(21) Appl. No.: 09/283,694

(22) Filed: Apr. 1, 1999

(51) Int. Cl.[7] ...................................................... C03C 4/12
(52) U.S. Cl. ............. 501/32; 252/301.4 R; 252/301.4 F; 252/301.4 S; 252/301.4 H; 252/301.6 S; 252/301.6 H
(58) Field of Search ...................... 252/301.4 R, 301.6 S, 252/301.4 S, 301.4 H, 301.6 H; 561/32

(56) References Cited

U.S. PATENT DOCUMENTS 5,271,754 * 12/1993 Bauerecker et al. .................. 65/18.1

FOREIGN PATENT DOCUMENTS 61-227941 * 10/1986 (JP) .
9-77533 * 3/1997 (JP) .

* cited by examiner

*Primary Examiner*—C. Melissa Koslow

(57) ABSTRACT

This invention comprises a method for mechanically mixing inorganic phosphors that have long-duration afterglow with soda-lime-silica glasses. The phosphor-glass compositions produced having no significant reduction in phosphorescence. Such compositions may be used to form glass artifacts of arbitrary physical dimensions, thus allowing for a wide variety of phosphorescent commercial glass products to be manufactured.

8 Claims, No Drawings

METHOD FOR PRODUCING PHOSPHORESCENT GLASS ARTIFACTS

The present invention relates to a method that is adaptable to standard glass forming techniques, which produces an inorganic phosphor-soda-lime-silica glass composition.

BACKGROUND OF THE INVENTION

Luminescence is photon emission initiated by energy forms other than thermal agitation. Phosphorescence denotes luminescence of long-duration. The ability of a phosphorescent solid to emit photons upon excitation is dependent upon the arrangement and population of the electronic energy levels of its constituent molecules. Electrons situated in metastable states migrate to higher energy levels under excitation, and emit photons upon their return to the lower levels. The requisite electronic arrangement is achieved by incorporation of a foreign ion, or inorganic activator in a host crystal, and the combination is termed a luminescent center.

Chemical interaction between a luminescent center and another chemical entity may adversely affect the desired electronic arrangement, causing decreased luminescence. Iron, cobalt, potassium, and arsenic are such entities, and are thereby called poisons. The synergistic electronic band configuration between host and activator is also disturbed by physical treatment such as grinding and excessive heating. At present, inventions comprising phosphor-glass compositions generally involve manufacturing processes for glass films not more than 5 mills in thickness. Said films are deposited on a substrate to form screens which are used in the manufacture of cathode-ray tubes, electro luminescent devices, fluorescent lighting, luminous markers, dials and indicators, and radiation detection and measurement instruments.

Crystalline luminescent ceramic materials, where the phosphor crystals are formed in situ from glasses, can be used to form luminescent artifacts of arbitrary physical dimensions. However, the luminescence produced by such a material is of short duration. Such materials are primarily applied in thin films for photo and electroleminescent devices. Heretofore, serious difficulties have been encountered in the process of incorporating phosphors into a glass matrix because the phosphors cannot readily withstand the high temperatures of the molten or softened glass, and are deleteriously affected or destroyed by the excessive heat even in a relatively short time. As a result, glass products containing phosphors show a substantial loss in light output efficiency.

Fusion of a phosphor-glass frit mixture at lower temperatures is not desirable due to air becoming trapped in the mixture as fusion takes place. This results in many of the phosphor particles failing to become completely encapsulated by the glass. The structural properties of such a fused mix are rather poor.

SUMMARY AND DETAILED DESCRIPTION OF THE INVENTION

A principal object of this invention is to provide a method for incorporating solid phosphorescent substances into a glass matrix without deleteriously affecting the phosphorescence.

Another object is the provision of a luminescent material, consisting of a solid phosphor homogeneously mixed in a glass matrix, which will phosphoresce under proper activation radiation.

A further object of this invention is the creation of artifacts with arbitrary physical dimensions, manufactured from said luminescent material. Another object of the present invention is to provide a method for producing said luminescent material that is adaptable to present glass forming technology. Other objects and advantages of the present invention will become apparent from the following description of the method.

The method described herein is crude, and the preferred method is to mix the phosphor in at the feeder in a glass-producing facility, at the prescribed temperature. The phosphor used was copper activated zinc sulfide with less than 0.5% copper by weight as part of its chemical structure. Manganese activated zinc sulfide can also be used. The phosphor particle size was from 18 to 25 microns. The glass used was a soda-lime-silica glass with a weight percent composition in the range of: $SiO_2$: 70–74; $Al_2O_3$: 0.5–2.5; $Na_2O$: 12–16; CaO: 5.5–14; MgO: 0–6.5 A standard cement mix was chosen to make the crucibles. It is inexpensive, heat resistant, and can easily be broken away from the finished sample. Once the crucible was formed, it was lined with a paste of magnesium hydroxide and dried in place at 100° F. to prevent bonding of the phosphor-glass mix with the cement. Crushed glass with mean particle size of 3 mils was then poured into the crucible to fill the entire cavity. The glass-filled crucible was then placed into a small electric (4 inx 4 inx 4 in interior ), 900 watt ceramic fiber kiln rated at 2000° F. and heated to 1600° F. The glass was allowed to remain at this temperature until all the entrapped air had escaped (approximately 20 minutes ). Once the glass sample was free of air bubbles, the temperature was raised to 1750° F. (with a kiln gauge accuracy of 25° F.). This temperature is critical to insure that the ZnS phosphor being used does not appreciably oxidize within the mixing time of approximately 1.5 minutes. It was chosen to provide a low enough viscosity of the glass to effect a reasonably homogeneous mix, while still maintaining molecular integrity of the phosphor. At lower temperatures, the glass becomes too stiff to work, and at higher temperatures, the cited phosphor starts to noticeably oxidize. The crucible was then quickly removed from the kiln and the phosphor was poured on top of the sample. To insure no quenching by an introduced metal, a well oxidized steel screwdriver was then used to manually fold and draw the phosphor and softened glass until the mixture became too stiff to work At that point, the crucible and contents were left in ambient temperature, and allowed to cool down to 1000° F. The crucible and contents were then placed back into the kiln, and the sample was allowed to anneal for 6 hours at 1000° F. Once annealed, the crucible was broken away from the sample, the sample was cooled to ambient temperature by exposure to air, and was then scraped and cleaned with diluted hydrochloric acid. The resultant samples had reasonably good homogeneity. All samples were of cylindrical form with diameter and length of approximately 38 mils.

It was determined experimentally that the percent by weight of phosphor to final product is in the range 2%–40%. Below 2%, the intensity of the luminescence is dim. Above 40% the intensity is not noticeably increased. At approximately 55%, the molecular structure of the glass is weakened to the point of mechanical decomposition.

It is also possible to use one of the following doped alkaline earth sulfide phosphors: CaS—X, SrS—X, BaS—X, where X represents one of the elements bismuth, magnesium, manganese, copper, or lead as activators.

When using the cited phosphors, the composite is formed at approximately 100° F. lower than the typical working point for soda-lime-silica glasses. Hence forming techniques are limited. The composition may be rolled to form glass sheets for glass art purposes and glass tile. Low temperature injection molding is also possible.

Using Super-Glo 05 phosphor, which is a metal oxide mixture ($Al_2O_3.SrO.MgO.EuO.B_2O_3$), the mixing temperature was raised to 2000° F. without noticeable diminishing of phosphorescence. This Temperature is well within the working range of commercial soda-lime glass, and higher mixing temperatures are possible. Hence the method is adaptable to present glass-forming technology.

Although not necessary, it would be advantageous to mix the phosphor and glass in an inert atmosphere or vacuum to further reduce oxidation of the phosphor.

It will be evident to those skilled in the art that any modifications of this invention to accommodate commercial glass forming processes can be made without departing from the spirit and scope of this disclosure or the scope of the following claims.

I claim:

1. A method for producing a phosphorescent glass article comprising mixing, under ambient conditions, less than 55 wt % of a phosphor and a molten glass composition, where the temperature of the glass is below the decomposition temperature of the phosphor and above the minimum working temperature.

2. The method of claim 1 where said glass is soda-lime-silica glass with a weight percent composition in the range of: $SiO_2$: 70–74; $Al_2O_3$: 0.5–2.5; $Na_2O$: 12–16; CaO: 5.5–14; MgO: 0–6.5.

3. The method of claim 1 where said phosphor is zinc sulfide with copper or manganese as activators, and the mixing temperature is about 1750° F.

4. The method of claim 1 where said phosphor is calcium sulfide with one of the elements: bismuth, magnesium, manganese, copper, or lead as activators, and the mixing temperature is about 1750° F.

5. The method of claim 1 where said phosphor is strontium sulfide with one of the elements: bismuth, magnesium, manganese, copper, or lead as activators, and the mixing temperature is about 1750° F.

6. The method of claim 1 where said phosphor is barium sulfide with one of the elements: bismuth, magnesium, manganese, copper, or lead as activators, and the mixing temperature is about 1750° F.

7. The method of claim 1 where said phosphor is the metal oxide mixture ($Al_2O_3.SrO.MgO.EuO.B_2O_3$), and the mixing temperature is about 2000° F. with higher mixing temperatures possible.

8. The method of claim 1, wherein the phosphor is added after the fining step of a glass forming process, but before the shaping step of the process.

* * * * *